United States Patent [19]
Byren et al.

[11] Patent Number: 5,974,061
[45] Date of Patent: Oct. 26, 1999

[54] LASER PUMP CAVITY APPARATUS WITH IMPROVED THERMAL LENSING CONTROL, COOLING, AND FRACTURE STRENGTH AND METHOD

[75] Inventors: Robert W. Byren, Hermosa Beach; David S. Sumida, Los Angeles; Hans W. Bruesselbach, Calabasas, all of Calif.

[73] Assignee: Raytheon Company, Lexington, Mass.

[21] Appl. No.: 08/994,423

[22] Filed: Dec. 19, 1997

[51] Int. Cl.$^6$ .................................................. H01S 3/04
[52] U.S. Cl. ............................... 372/34; 372/29; 372/39; 372/40; 372/69; 372/70; 372/71; 372/72; 372/75
[58] Field of Search .................................... 372/9, 25, 29, 372/34, 39, 40, 69, 70, 71, 72, 75, 95, 99

[56] References Cited

U.S. PATENT DOCUMENTS

| | | | |
|---|---|---|---|
| 4,797,893 | 1/1989 | Dixon | 372/66 |
| 4,858,242 | 8/1989 | Kuper et al. | 372/72 |
| 5,093,832 | 3/1992 | Bethune et al. | 372/34 X |
| 5,245,623 | 9/1993 | McFarlane | 372/69 |
| 5,317,585 | 5/1994 | Gregor | 372/75 X |
| 5,345,458 | 9/1994 | Alger | 372/34 |
| 5,349,600 | 9/1994 | Shinbori et al. | 372/92 |
| 5,463,649 | 10/1995 | Ashby et al. | 372/75 X |
| 5,521,936 | 5/1996 | Irwin | 372/75 |
| 5,619,522 | 4/1997 | Dube | 372/72 |
| 5,651,023 | 7/1997 | MacKinnon | 372/107 |
| 5,751,750 | 5/1998 | Friede et al. | 372/34 |
| 5,761,233 | 6/1998 | Bruesselbach et al. | 372/72 |
| 5,781,580 | 7/1998 | Winik | 372/99 |

FOREIGN PATENT DOCUMENTS

0801449 A2  10/1997  European Pat. Off. ............ 372/92 X

OTHER PUBLICATIONS

Encapsulated rod for efficient thermal management in diode-–sid–pumped Nd:YAG lasers Applied Optics vol. 35 No. 15 May 20, 1996 pp. 2562–2565.

*Primary Examiner*—Brian Healy
*Attorney, Agent, or Firm*—Colin M. Raufer; Leonard A. Alkov; Glenn H. Lenzen, Jr.

[57] ABSTRACT

A laser pump cavity apparatus with integral concentrator provides improved thermal lensing control, cooling and fracture strength. The concentrator is formed around a doped solid-state laser medium by diffusion bonding, using a material different than the doped laser medium and with a substantially lower index of refraction, higher thermal conductivity and higher stress fracture strength than the doped laser crystal. The concentrator has a top cladding layer with a cylindrical focusing surface and a bottom cladding layer with a cylindrical focusing surface and may have edge cladding layers. Cold plates, each of which also has one cylindrical surface, are placed in thermal contact with the cylindrical surfaces of the top and bottom cladding layers. The cylindrical surfaces preferably have hyperbolic or quasi-hyperbolic shape. The laser pump cavity apparatus is preferably pumped with several laser diode arrays in directions transverse to a laser beam axis. The pumplight is injected from the laser diode arrays through the edge cladding layers in directions toward line foci of the cylindrical surfaces. The concentrator top and bottom cladding material is preferably sapphire and the doped solid-state laser medium is preferably Yb:YAG. The edge cladding layers are preferably thermally insulating to maintain a one-dimensional heat flow condition within the doped laser medium, by forming them of a material that has lower thermal conductivity than the material used for the top and bottom cladding layers. The edge cladding layers are preferably made of undoped YAG material

19 Claims, 4 Drawing Sheets

LASER PUMP CAVITY APPARATUS WITH IMPROVED THERMAL LENSING CONTROL, COOLING, AND FRACTURE STRENGTH AND METHOD

This application is related to copending applications filed on the same date herein entitled Laser Pump Cavity apparatus with integral concentrator and Method, Ser. No. 08/994,796 (Attorney Docket No. 970064), pending, and Thermally Improved Slab Pump Cavity Apparatus With Integral Concentrator, Ser. No. 08/994,422, pending, (Attorney Docket No. 970508).

TECHNICAL FIELD

The present invention relates generally to the field of lasers and more particularly to a laser pump cavity apparatus with integral pump light concentrator.

BACKGROUND

In integrating laser pump cavities, the pumplight is reflected more than once. Thus, pump absorption is superimposed during several passes through the slab. In integrated laser pump cavity devices with an integral concentrator such as as described in commonly assigned co-pending patent application No. 08/994,422 [Attorney docket 970508], pending, the doped laser crystal and the concentrator are typically both made of the same crystal type. The doped laser crystal and the undoped concentrator are generally made using diffusion bonding technology which is well known in the industry. Diffusion bonding technology produces a bond that is as strong as the host crystal and provides a good optical, mechanical and thermal interface. Conventional diffusion bonding is performed on crystals of similar type.

Diffusion bonding of dissimilar crystal types has recently been developed by Onyx Optics under a Phase I Small Business Innovative Research (SBIR) grant, funded by the U.S. government. Specifically, a 4 mm by 4 mm interface between ytrrium aluminum garnet (YAG) and sapphire ($Al_2O_3$) was formed by the Onyx Optics diffusion bonding process that exhibited low stress birefringence (<10 nm/um wavefront retardation) without fine annealing, high bond strength (600 Mpa equivalent to bulk YAG), and high thermal shock resistance. The proposed uses to date do not include high power solid-state laser pump cavities with integral concentrators.

SUMMARY

The pump cavity of the present invention is a form of integrating pump cavity made of a high aspect ratio slab of solid-state laser material that is uniformly and efficiently pumped with laser diode arrays in directions transverse to the laser beam axis. The present invention relates to an apparatus and method for forming cladding layers which provides improved thermal lensing control, cooling, and fracture strength properties in a slab laser pump cavity apparatus with an Integral concentrator. In this invention the diffusion bonded cladding layer is preferably of dissimilar crystal type than the doped laser crystal active region.

An overall aspect of the present invention is a method of cladding a high aspect ratio slab laser pump cavity apparatus with a material that preferably has a lower index of refraction, higher thermal conductivity and higher stress fracture strength than the doped solid-state active lasing region (crystal or glass).

A more specific aspect of the present invention is a laser pump cavity apparatus with integral concentrator which has a doped laser crystal active lasing region, a concentrator having at least top and bottom layers which are made of a crystal material different from the doped laser crystal used to form the active laser region and preferably with lower index of refraction, higher thermal conductivity and higher stress fracture strength, The concentrator includes a top cladding layer formed on a top surface of the doped laser crystal with a substantially cylindrical concave outer surface, and a bottom cladding layer formed on a bottom surface of the doped laser crystal with a substantially cylindrical concave outer surface. The concentrator may include edge cladding layers formed on the side surfaces of the doped laser crystal Each cylindrical surface preferably defines a respective optical line focus, with one optical line focus preferably being located above and the other below the laser pump cavity apparatus.

The laser pump cavity apparatus is preferably pumped with one or more laser diode arrays to provide a source of pumping energy in a direction substantially transverse to the laser beam axis. The cylindrical surfaces preferably have hyperbolic or quasi-hyperbolic cylindrical shape and may be in thermal contact with a pair of cold plates to absorb heat from the two major faces of the slablike lasing region.

In one specific embodiment of the laser pump cavity apparatus, the edge cladding layers are made of a material that has a lower thermal conductivity than the material used for the top and bottom cladding layers, thereby maintaining a one-dimensional heat flow condition from the active region of the laser device through the top and bottom cladding layers and into the cold plates. For use in a ytterbium doped yttrium aluminum garnet ($YB_2$ YAG) laser edge cladding layers are preferably made of undoped YAG material and the top and bottom cladding layers are preferably made of sapphire.

The foregoing and additional features and advantages of this invention will become further apparent from the detailed description and accompanying drawing figures that follow In the figures and written description, numerals indicate the various features of the invention, like numerals referring to like features, throughout for the drawing figures and the written description.

DRAWINGS

DETAILED DESCRIPTION

Figure 1:
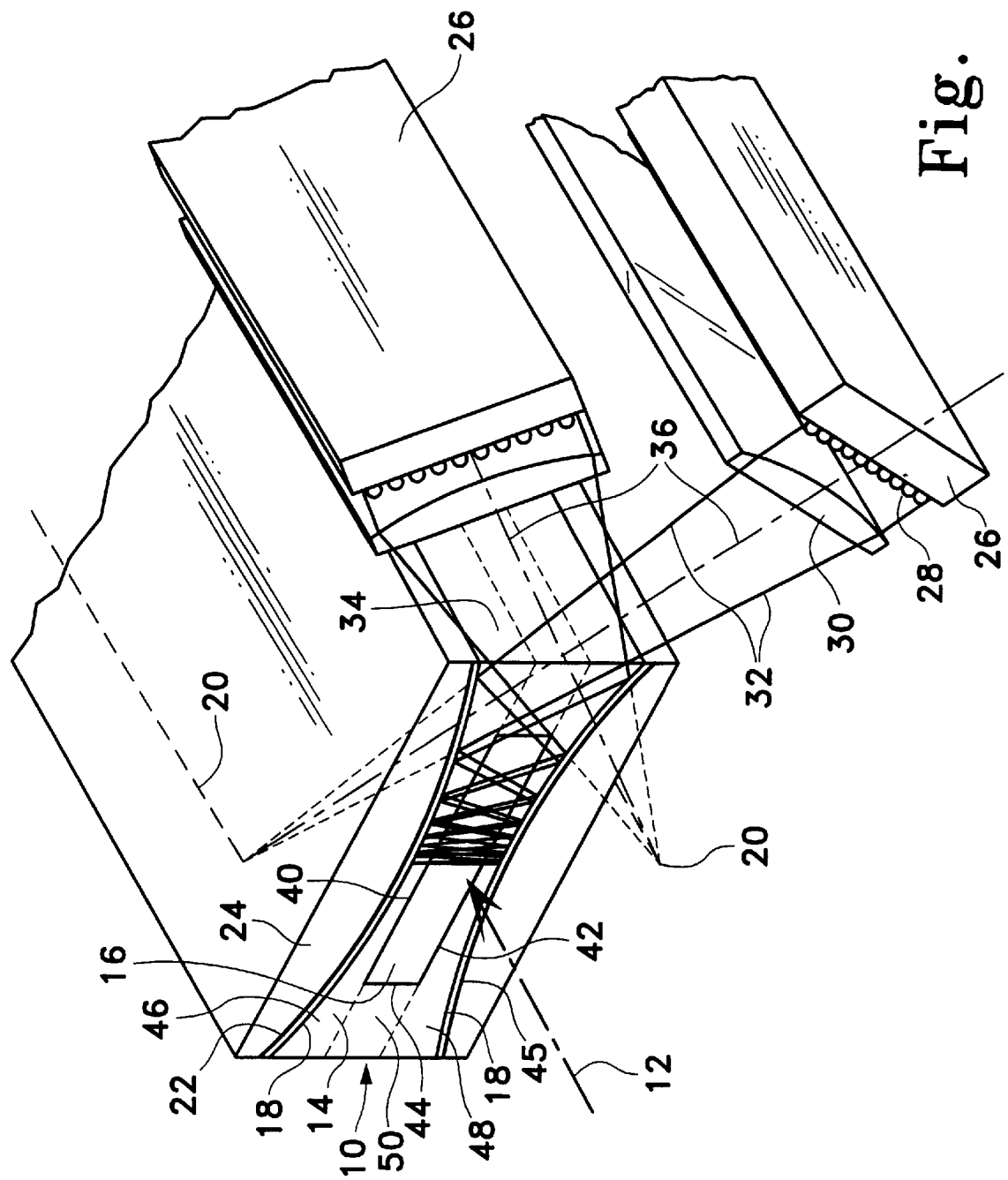
FIG. 1 is a schematic illustration showing an isometric view of one preferred embodiment of a slab laser pump cavity apparatus with integral concentrator. Laser diode arrays and rays of pumplight at the left side of the pump cavity are not shown in order to preserve clarity.

FIG. 1 is a schematic illustration showing an isometric view of a preferred embodiment of a slab laser pump cavity apparatus with integral concentrator. This embodiment consists of an edge-pumped configuration which employs a slab-shaped laser pump cavity 10 preferably constructed by diffusion bonding an undoped cladding layer such as sapphire 14 around a doped laser crystal active lasing region such as YAG 16, made of a high-aspect ratio slab, which has been doped with an active ion, such as ytterbium. The cladding layer 14 concentrator has a top cladding layer 46 with a concave, upwardly facing outer cylindrical surface 18, a bottom cladding layer 48 having a concave, downwardly facing outer cylindrical surface 18 and a pair of edge cladding layers 50. The active lasing region 16 preferably has a rectangular cross-section and is pumped by laser diode arrays 26.

The disclosed embodiment preferably uses pumping in directions transverse to the laser beam axis 12, i.e., edge-pumping or side-pumping, although it could also be used with other pumping methods. Edge-pumping implies that pumping is accomplished from a narrow side (edge) of the slab, and not from a wide face of a slab, such as a top or bottom side. At least the top and bottom cladding layers 46,48 are preferably made of undoped sapphire, which is of dissimilar crystal type from the doped laser crystal active lasing region 16, which is preferably Yb:YAG.

The cylindrical outer surfaces 18 on the top and bottom cladding layers 46,48 of the undoped cladding layer 14 are preferably aligned longitudinally with the laser axis 12 and designed with a concave hyperboloid or near-hyperboloid shape to more uniformly distribute the transverse pump light within the active region 16. Each cylindrical surface 18 has its line focus 20 outside the laser pump cavity 10, as shown in FIG. 1, one above and the other below the laser pump cavity 10. The cylindrical outer surfaces 18 are preferably coated to ensure high reflectivity at the pump wavelength The cylindrical surfaces 18 are preferably covered with a compliant thermal interface material 22 and each cold plate 24 preferably has a cylindrical 45 surface placed adjacent to the thermal interface 22 which closely conforms to the shape of cylindrical surface 18, thereby facilitating thermal flow from the active region 15 to the cold plates 24. Heat is extracted from the doped laser crystal slab active lasing region 16 by conduction through the undoped cladding layer 14 and through the thermal interface 22 to the cold plate 24. The thermal interface 22 is preferably made of gold or indium metal foil and the cold plate 24 of an aluminum or copper alloy.

The pumplight is emitted by the laser diode arrays 28, available commercially, which preferably have integral cylindrical microlenses 28 that act to collimate the pumplight from each diode bar a direction normal to the emitting surface. The collimated pumplight from each laser diode array 26 is then focused by a large cylindrical lens 30 so that the converging rays of pumplight 32, after being refracted at an entrance surface of the pump cavity 34, are directed toward the line foci of the cylindrical surfaces 20. The entrance surface of the laser pump cavity 34 is coated with material which has antireflection properties at the pump wavelength, for the predetermined range of incidence angles, to maximize transmission of the pumplight into the laser pump cavity 10.

In the illustrated embodiment, principal rays of pumplight 32, which are focused at one of the line foci of cylindrical surfaces 20, are reflected, by the non-corresponding cylindrical surface 18, toward the other line focus 20, and this reflecting process is repeated with both cylindrical surfaces 18, thus trapping substantially all of the pumplight within the laser pump cavity 10 until it is substantially absorbed. Although paraxial rays are not perfectly trapped, the absorption efficiency for paraxial rays over total path length is high. The overall pumping efficiency of the laser pump cavity 10 is therefore very high, and depends on the absorption of the undoped cladding layer 14, the quality of the high reflectivity coatings on the cylindrical surfaces 18, and the quality of the antireflection coatings at the entrance surfaces of the pump cavity 34.

Figure 2:
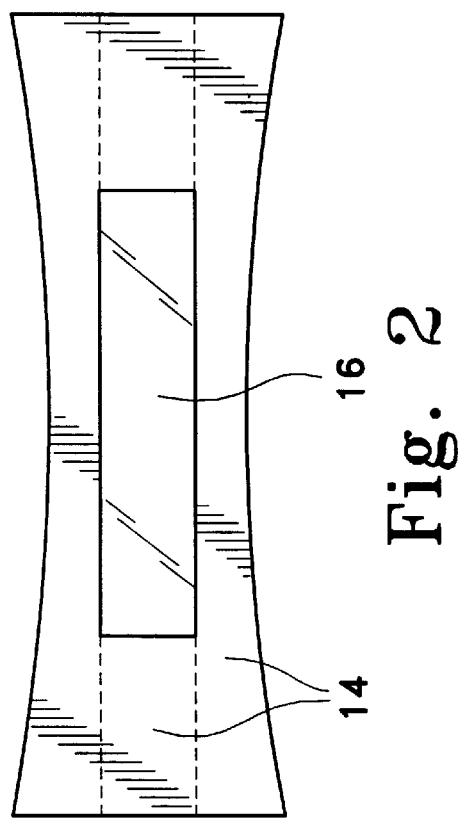
FIG. 2 is a plan view schematic illustration of the slab laser pump cavity apparatus of FIG. 1.

FIG. 2 is a plan view schematic illustration of a slab laser pump cavity apparatus with improved thermal lensing control, cooling, and fracture strength which uses sapphire ($Al_2O_3$) in the undoped cladding layer 14 and ytterbium-doped yttrium aluminum garnet (Yb:YAG) as the active lasing region 16. Sapphire has a lower index of refraction, higher thermal conductivity and improved stress fracture strength over undoped YAG. Therefore, use of sapphire brings three improvements to the slab laser pumphead: improved thermal lensing control, cooling and fracture strength. A particular application of this invention may benefit by any or all of these three improvements, and depends on the specific selection of the active lasing region 16 medium and the cladding layer 14 material.

Figure 3:
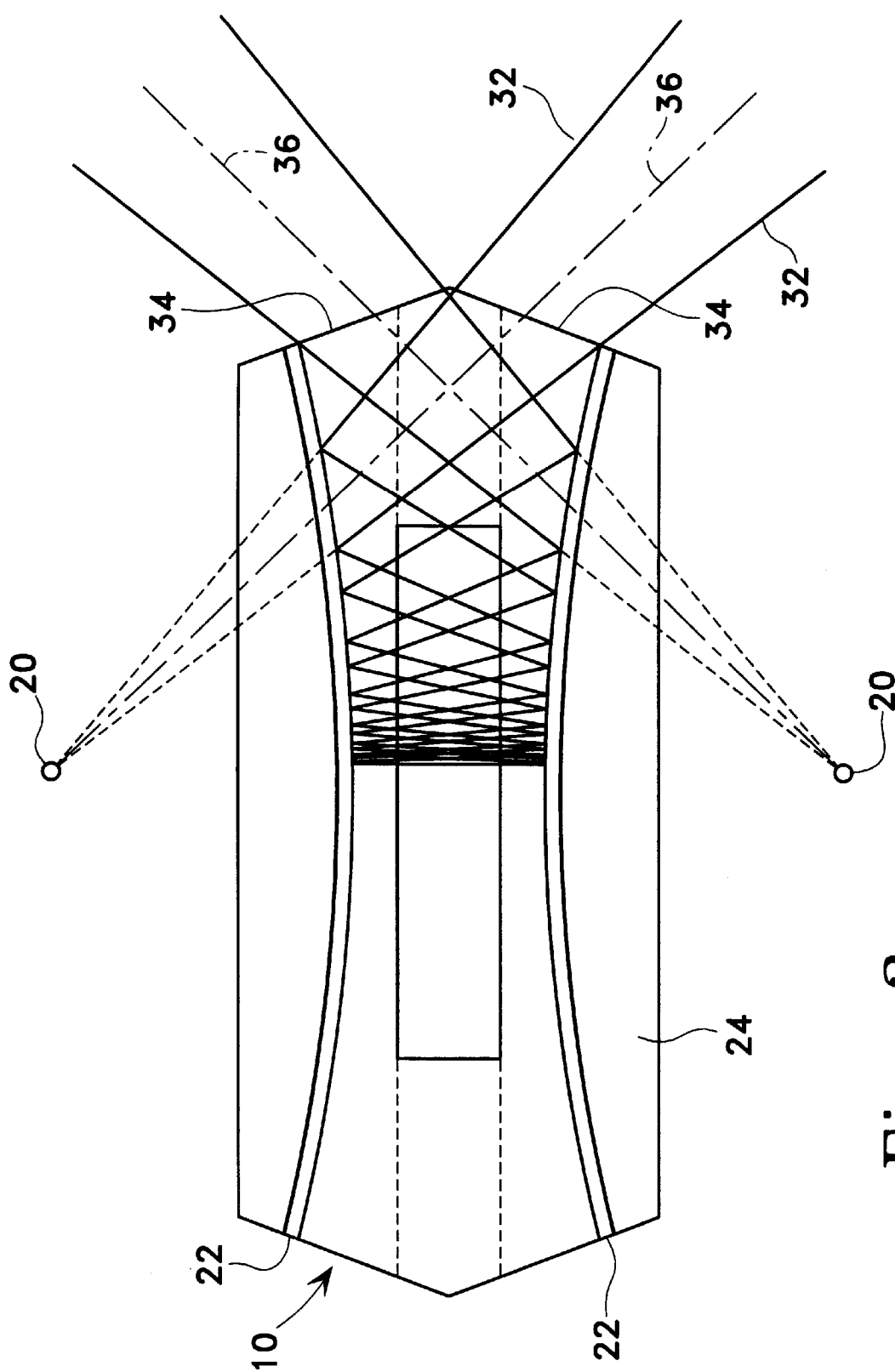
FIG. 3 is a plan view schematic illustration of a slab laser pump cavity apparatus with integral concentrator designed for low f/number pumping, in accordance with another embodiment of the present invention.

For implementations requiring low f/number pumping, it may be advantageous to shape and/or coat the entrance surface(s) at the side edges of the pump cavity 34 to maximize transmission and avoid critical angle limitations. FIG. 3 is a plan view schematic illustration of a slab laser pump cavity apparatus with integral concentrator designed for low f/number pumping, in accordance with another embodiment of the present invention In this aspect the cladding layer 14 is preferably made of sapphire, which is of dissimilar crystal type from the doped laser crystal active lasing region 16, which is preferably Yb:YAG. This embodiment, instead of one entrance surface of the pump cavity 34 on each side. The precise angle of the entrance surface of the pump cavity 34 is selected according to the application and is based on a tradeoff between pumping efficiency and suppression of lateral parasitic lasing modes. The lateral parasitic lasing modes can reduce the stored energy in a Q-switched application or compete with the desired lasing process along the laser beam axis 12 in continuous or long-pulse applications.

The designer can shift the distribution of absorbed pumplight toward the center of the slab by slightly undershooting the line foci 20, which is accomplished by placing the line focus of each laser diode array pump 38 in the region between the cylindrical surface 18 and the line focus 20 corresponding to that cylindrical surface 18.

In the disclosed embodiment, use of a cladding material with lower index of refraction results in total internal reflection of rays within the laser beam that are incident on the cladded surface of the active lasing region 16 which have an angle of incidence greater than a critical angle. These reflected laser beam rays are guided within the active lasing region 16, thereby minimizing the effects of the laser light being spread due to distributed thermal lensing or diffraction along the length of the slab. Without light guiding, the thermal lensing and free space diffraction within the integrating slab structure would cause the laser beam to spread and eventually exit from the active lasing region 16 would not be amplified.

Use of a cladding material with a higher thermal conductivity lowers the operating temperature of the active lasing region 16 medium, thereby increasing the laser emission cross section (gain) and improving the extraction efficiency.

Use of a cladding material having a higher stress fracture strength allows use of shorter slabs with increased pump power per unit length. This presumes that the active lasing region 16 receives its tensile stress from the cladding region 14 and that the limiting parameter is the surface tensile strength of the cladding material. Reducing the required slab length improves laser performance by reducing the linear loss within the slab segments and the Fresnel losses at the interfaces between slab segments, if multiple slab segments are required due to crystal growth limitations. Reducing the number of slab segments also lowers cost.

The properties of sapphire, including a lower index of refraction, higher thermal conductivity and improved stress fracture strength over a conventional YAG material, bring significant improvements to the disclosed slab laser pump cavity devices over alternative devices made entirely of YAG For example, the index of refraction for YAG, at 1 $\mu$m wavelength and 300° K. temperature, is approximately 1.819 while the index of refraction for sapphire is 1.755.

In order to achieve total internal reflection, laser light should propagate within the active lasing region 16 at angles of incidence greater than the critical angle. For the YAG/sapphire index of refraction ratio, the critical angle to achieve total internal reflection is given as:

$$\theta_c = \arcsin(1.755/1.819) = 74.76°$$

Therefore, laser light may be guided through the active lasing region 16 at angles of incidence between 90° (i.e., along beam axis 12) and 74.76°.

Figure 4:
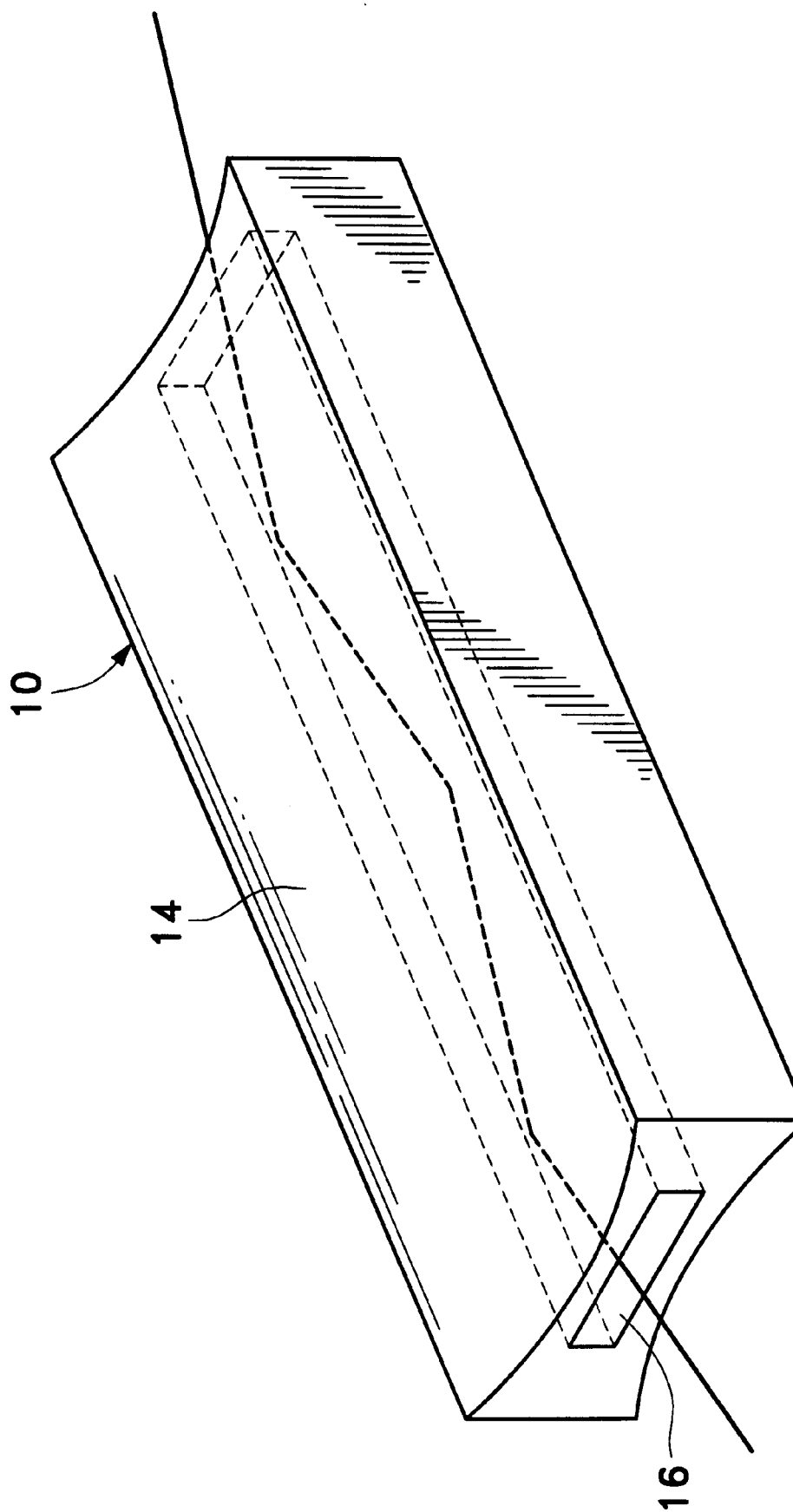
FIG. 4 is a plan view schematic illustration of the slab laser pump cavity apparatus of FIG. 1, showing one method of laser light guiding within the active lasing region.

FIG. 4 is a plan view schematic illustration of one method of guiding laser light through a slab laser pump cavity apparatus total internal reflection, for improved thermal lensing control In this method the laser light is constrained by bouncing off the top and bottom surfaces of the active lasing region 16, following a zig-zag optical path through the active lasing region 16, so that every part of the beam sees the same optical path length through the active lasing region 16.

The concept of a slab laser geometry with a zig-zag optical path confined in the slab by total internal reflection was first proposed by Martin and Chernoch, U.S. Pat. No. 3,633,126, issued in 1972. In conventional embodiments of the zigzag slab concept, the large faces of the slab responsible for guiding the laser beam by total internal reflection are exposed to the environment and, in some embodiments, to cooling fluids. Scratches and erosion of these exposed surfaces result in optical degradation which adversely affects the beam quality and lifetime of the laser. In the present embodiment of the invention, these surfaces are protected by the cladding layers and optical degradation due to scratches and erosion will not occur.

The operating temperature of the laser is a function of the ultimate heatsink temperature, the physical shape of the various materials between the active lasing region 16 of the slab and the heatsink, the thermal conductivities of these materials, and the contact thermal conductivities at the interfaces between these materials.

TABLE

| PARAMETER | UNITS | IN YAG | IN SAPPHIRE |
|---|---|---|---|
| refractive index, n at 1.03 $\mu$m, $\lambda$ | — | 1.819 | $n_o$ = 1.755<br>$n_e$ = 1.747 |
| thermal conductivity, $\kappa$ | W/cm · K | 0.10 | 0.35 $\parallel$ c-axis<br>0.33 $\perp$ c-axis |
| thermal expansion coefficient, $\alpha$ | $(\times 10^{-6})K^{-1}$ | 6.9 isotropic | 6.8 $\parallel$ c-axis<br>5.4 $\perp$ c-axis |
| thermal shock parameter, R | W/cm | 7.9 | 100 |

As can be seen from the Table, where all values are given at temperature of 300 K degrees, the thermal conductivity of sapphire (approximately 0.34 W/cmK) is three times as high as that for YAG (0.10 W/cmK). Therefore, the temperature drop across the sapphire cladding layer 14 is approximately three times smaller than that across a similarly sized YAG cladding layer 14 for a the same thermal load. For ytterbium and most rare earth lasing species, reducing the temperature of operation increases the stimulated emission cross section of the active lasing region 16. This lowers the saturation fluence of the active lasing region 16 medium, making it easier to extract the stored energy for Q-switched systems without damaging either the optical coatings at the exit surfaces or the bulk lasing material. At room temperature, the cross section of Yb:YAG changes by approximately 8% for a 10° C. change in the operating temperature of the active lasing region 16 medium.

With the availability of high brightness diode pump arrays, the minimum length of the laser active lasing region 16 medium along the lasing axis mostly depends on the fracture strength of the medium. A shorter laser medium is advantageous because it reduces the linear optical loss associated with absorption of the laser light in the medium and, in embodiments where the desired length of the slab exceeds the growth limits of the laser crystal, it also reduces the number of required slab segments and the attendant Fresnel loss at the interfaces The properties of the diffusion bonded slab laser pump cavity devices depend on the fracture strength of the overall structure and not just the fracture strength of the active lasing region 16. Diffusion bonding passivates the interface surface and inhibits both the formation and propagation of surface microcracks that are responsible for catastrophic fracture of the active lasing region 16 medium. Cladding the active Yb:YAG region with sapphire, in addition to passivating the interface surface, also reduces tensile stress near the surface of the Yb:YAG active lasing region 16 during steady state lasing. The tensile stress reduction near the surface of the Yb:YAG region occurs because the coefficient of thermal expansion for sapphire is $\alpha < 6.8 \times 10^{-6}$ $K^{-1}$, depending on crystal axis orientation, which is less than that for other conventional cladding materials such as YAG, where $\alpha = 6.9 \times 10^{-6}$ $K^{-1}$. Thus the cladding layer 14 tries to maintain a compressive force on the YAG side of the interface. This behavior is analogous to the property of tempered glass in which the glass surface is kept in compression, thereby resisting thermal stress fracture with high temperature gradients across the glass wall.

Because the thermal expansion coefficient for sapphire is a function of crystal axis orientation, the designer has the freedom to select an optimum crystal axis orientation that will control the stress transfer at the interface and/or reduce the stress birefringence effects within the active lasing region 16.

The diffusion bond between the active lasing region 16 and the cladding layer 14 transmits stress from the active lasing region 16 to the cladding layer 14, putting the surface of the cladding layer 14 under tension. The fracture toughness and thermal conductivity of the cladding layer 14 are therefore important determinants of the overall thermal fracture strength of the monolithic slab laser pump cavity. Because sapphire has a higher fracture toughness and thermal conductivity than YAG, its thermal shock parameter (100 W/cm) is more than an order of magnitude higher than YAG (7.9 W/cm). The sapphire cladding layer 14, therefore, can handle much higher thermal loads without stress fracture than the YAG cladding layer 14 disclosed in the referenced copending application.

In some applications it is important to maintain a one-dimensional heat flow within the active lasing region 16. By orienting the linear polarization of the laser beam either perpendicular or parallel to the heat flow direction, depolarization within the slab, due to thermal stress birefringence, can be minimized. As is conventionally known, thermally insulating the edge of a laser slab approximates the ideal one-dimensional heat flow condition. In the present invention this can be accomplished by first diffusion bonding each side surface of the active lasing region 16 with an edge cladding layer 50 that has lower thermal conductivity than the top and bottom cladding layers 46, 48 used at the top and bottom surfaces of the doped laser crystal 16.

Figure 5:
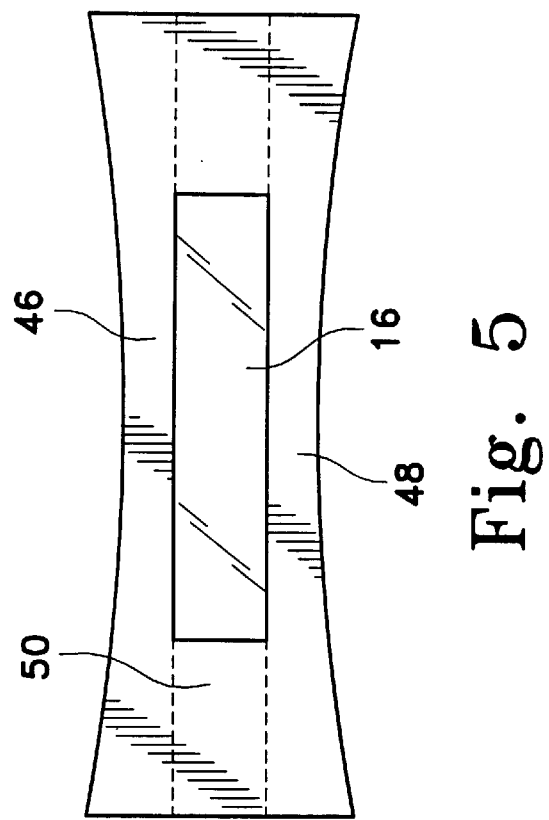
FIG. 5 is a plan view simplified schematic illustration of an alternate embodiment of a slab laser pump cavity apparatus with thermally insulating edge cladding applied to the active lasing region prior to applying the top and bottom cladding layers.

FIG. 5 is a plan view simplified schematic illustration of an alternate embodiment of a slab laser pump cavity apparatus with thermally insulating edge cladding applied to the active lasing region prior to applying the top and bottom cladding layers. In this embodiment, undoped YAG could be used for the edge cladding layer 50 and sapphire could be used for the top and bottom cladding layers 46, 48. Edge claddings may also be composed of doped material in order to suppress amplified spontaneous emission and/or parasitic lasing.

Figure 6:
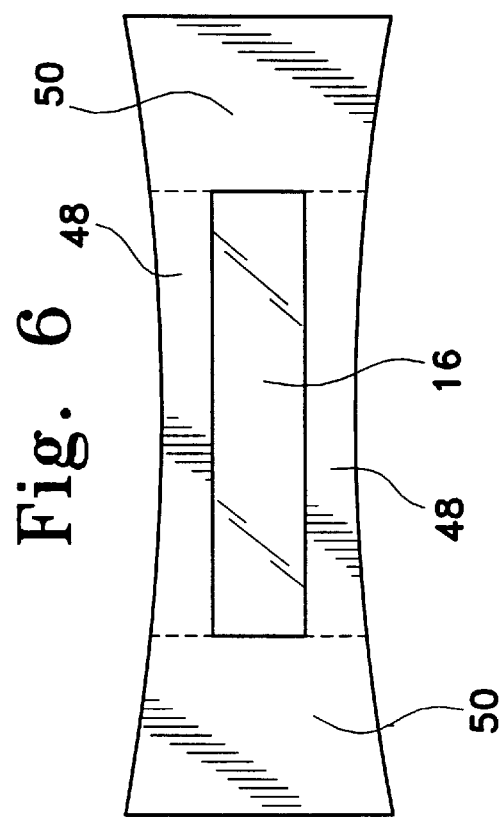
FIG. 6 is a plan view simplified schematic illustration of another alternate embodiment of a slab laser pump cavity apparatus with thermally insulating edge cladding applied to the composite concentrator structure.

Edge cladding can also be diffusion bonded to the composite concentrator structure either before or after the top and bottom cladding layers have been diffusion bonded. FIG. 6 is a plan view simplified schematic illustration of alternate embodiment of a slab laser pump cavity apparatus with thermally insulating edge cladding applied to the composite concentrator structure. An added advantage of this embodiment is improved heat flow that more nearly approximates the desired one dimensional condition near the edges of the active lasing medium. In this embodiment, undoped YAG could be used for the edge cladding layer 50 and sapphire could be used for the top and bottom cladding layers 46, 48.

The apparatus and method aspects of the present invention are believed to be applicable to all types of integrating laser pump cavity devices with integral concentrator such as are used in high power solid-state laser products for industrial and military applications.

While this invention has been described with reference to its presently preferred embodiment(s), its scope is only limited insofar as defined by the following set of claims and all equivalents thereof.

We claim:

1. A laser pump cavity apparatus with integral concentrator, comprising:
    a doped solid-state laser medium providing an active lasing region having a top surface, a bottom surface and at least two side surfaces surrounding a laser beam axis; and
    a concentrator having a top cladding layer formed on the top surface of the active laser region and having a first concave cylindrical outer surface, and a bottom cladding layer formed on the bottom surface of the active lasing region and having a second concave cylindrical outer surface, said first cylindrical surface defining a first optical line focus located parallel to the laser beam axis and above the laser pump cavity apparatus, said second cylindrical surface defining a second optical line focus located parallel to the laser beam axis and below the laser pump cavity apparatus,
    wherein
        at least the top and bottom cladding layers of the concentrator are formed of a different material than the doped solid-state laser medium.

2. The laser pump cavity apparatus of claim 1, wherein:
    the active lasing region is in the form of a high-aspect ratio slab,
    the doping of the active lasing region is performed with an active ion, and
    the concentrator is manufactured by a diffusion bonding process in which undoped cladding is diffusion bonded to at least the top and bottom surfaces of the active lasing region after the active lasing region has been doped with the active ion.

3. The laser pump cavity apparatus of claim 1, wherein:
    the concentrator material is sapphire, and
    the doped solid-state laser medium is Yb:YAG.

4. The laser pump cavity apparatus of claim 1, wherein:
    the concentrator is formed by diffusion bonding the cladding layers to the active lasing region.

5. The laser pump cavity apparatus of claim 1, wherein:
    at least the top and bottom cladding layers are formed from a material with having a lower index of refraction than the doped laser medium.

6. The laser pump cavity apparatus of claim 1, wherein:
    at least the top and bottom cladding layers are formed from a material having a higher thermal conductivity than the doped laser medium.

7. The laser pump cavity apparatus of claim 1, wherein:
    at least the top and bottom cladding layers are formed from a material having a higher stress fracture strength than the doped laser medium.

8. The laser pump cavity apparatus of claim 1, further comprising:
    a pair of edge cladding layers formed on the two edge surfaces of the active lasing region.

9. The laser pump cavity apparatus of claim 8, wherein:
    the edge cladding layers are formed from a second cladding material that has a lower thermal conductivity than the cladding material used to form the top and bottom cladding layers,
    whereby the edges of the active lasing region may be thermally insulated from the top and bottom cladding layers to maintain a one-dimensional heat flow condition through the top and bottom surfaces of the active lasing region.

10. The laser pump cavity apparatus of claim 9, wherein:
    the edge cladding layers are made of undoped YAG material and the top and bottom cladding layers are made of sapphire.

11. The laser pump cavity apparatus of claim 8, wherein:
    each edge cladding layer defines an entrance surface comprising two touching, slanted planes forming, each of said planes providing a lower angle of incidence to a corresponding laser diode pumping array.

12. The laser pump cavity apparatus of claim 1, further comprising:

an upper cold plate having a bottom surface in thermal contact with the first concave cylindrical outer surface; and a lower cold plate having an upper surface in thermal contact with the second concave cylindrical outer surface.

13. A method for manufacturing a laser pump cavity apparatus with integral concentrator, comprising the steps:

doping a crystal with ions to form an active lasing region, said active lasing region having a top surface, a bottom surface, and a pair of edge surfaces surrounding a laser beam axis, and diffusion bonding a concentrator around the active lasing region, said concentrator having a top cladding layer with a first cylindrical surface and a bottom cladding layer with a second cylindrical surface, wherein:

at least the top and bottom cladding layers are formed of a different crystalline material than the crystal used to form active lasing region.

14. The method of claim 13, wherein:

said different material is sapphire, and the doped laser crystal is Yb:YAG.

15. The method of claim 13, further comprising a step of: diffusion bonding two edge cladding layers to the edges of the active lasing region prior to diffusion bonding the top and bottom cladding layers.

16. The method of claim 13, further comprising a step of: diffusion bonding two edge cladding layers to the edges of the composite concentrator structure after the top and bottom cladding layers have been diffusion bonded to the active lasing region.

17. The method of claim 13, further comprising a step of: thermally insulating the edges of the active lasing medium to maintain a one-dimensional heat flow condition substantially perpendicular to the top and bottom surfaces of the active lasing region.

18. The method of claim 17, wherein:

the step of thermally insultating the edges of the active lasing region is accomplished by forming the edge cladding layers from a material that has a lower thermal conductivity than the material used to form the top and bottom cladding layers.

19. The method of claim 18, wherein:

the edge cladding layers are made of undoped YAG material and the top and bottom cladding layers are made of sapphire.

* * * * *